Dec. 16, 1969  E. E. MUELLER  3,484,306
MEDIUM TEMPERATURE TEMPORARY PROTECTIVE COATING
COMPOSITIONS FOR METALS AND RESULTING
COATED METAL ARTICLES
Filed April 3, 1964

EDWARD E. MUELLER
INVENTOR.

BY G. G. Christensen

ATT'Y

United States Patent Office 3,484,306
Patented Dec. 16, 1969

3,484,306
MEDIUM TEMPERATURE TEMPORARY PROTECTIVE COATING COMPOSITIONS FOR METALS AND RESULTING COATED METAL ARTICLES
Edward E. Mueller, Baltimore, Md., assignor, by mesne assignments, to SCM Corporation, New York, N.Y., a corporation of New York
Filed Apr. 3, 1964, Ser. No. 357,137
Int. Cl. C21d 1/68
U.S. Cl. 148—27
14 Claims

ABSTRACT OF THE DISCLOSURE

Medium temperature temporary protective coating compositions for metals which are to be heated to a temperature between 1850° F. and 2300° F. for hot working applications such as forging, heat treating, and the like, are described along with coated metal articles having a protective coating comprising the dry compositions. The coating compositions consist essentially of:
(A) from about 40 to about 80 weight percent of a comminuted inorganic material having a defined ultimate composition and containing MgO, $SiO_2$, and $Al_2O_3$, and
(B) from about 60 to about 20 weight percent of a liquid binding carrier in which the comminuted inorganic material is dispersed and suspended for application purposes. Such coatings are advantageous in protecting metal articles from oxidation, decarburization, and adverse alteration of their surfaces.

---

Figure 1:
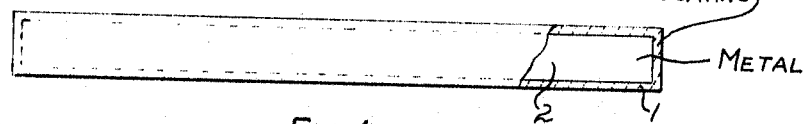

This invention relates to ceramic coatings adapted for temporary application to metals to thereby protect the latter while being heated at about 1800° F.–2300° F. for metallurgical and/or fabrication purposes. The invention also relates to the resulting coated metal articles.

In the processing of most steels and of many other kinds of metals which react at elevated temperatures with oxygen, introgen, hydrogen and/or carbon-containing gases, it is necessary at some stage to heat ingots, bars, billets, and other configurations in order to facilitate their fabrication into different shapes or to develop certain metallurgical properties. The temperatures involved are often times high enough to cause deleterious reactions to occur unless preventative steps are taken. These detrimental reactions assume many forms but, most notably in iron-base alloys, they may involve oxidation or decarburization. In the case of oxidation particularly, considerable losses of metal are common in the form of the oxide coating which is developed. One method of alleviating this difficulty is through the use of a controlled atmosphere furnace. In instances where large sizes are encountered, however, the cost of such an operation can be prohibitive.

Another means for accomplishing the same end considerably more economically is through the use of temporary protective coatings. In general these protective coatings serve as a barrier between the metal substrate and the furnace or ambient atmosphere and prevent the diffusion of gasified materials from the meal into the atmosphere or, conversely, the passage of gaseous contaminants to the metal substrate.

Coatings of various types have been used extensively for metal protection on a more or less permanent basis. Such coatings contain both organic and comminuted inorganic components and may also comprise predominantly metallic constituents. Conventional porcelain enamels are also in widespread use for permanent protection purposes.

Ceramic coatings of a temporary nature which have been developed in past years, although satisfactory from the point of view of protection, have had some limitations which have been overcome in the materials to be described hereafter. For the most part, entirely different inorganic components are here used in order (1) to extend the use range to considerably higher temperatures and (2) to be utilizable in conjunction with the considerably more complex alloys which have been developed during recent years. In addition, solidifiable organic components can be utilizable with solvents or aqueous liquids as carriers for the inorganic materials. Through their use, it has been possible to develop considerable handling resistance which is necessary in order to avoid coating damage from mechanical handling operations usually encountered in metal-working plants.

In order that such ceramic coatings may be made adaptable to a variety of metal-processing operations, they must have certain physical and chemical properties. Among these are the following:
(1) The consistency of the coating must be such as to permit application by spraying, brushing, or dipping.
(2) The coating must have a satisfactory "shelf life," i.e., must be a stable suspension or dispersion, in order to prevent excessive settling.
(3) The coating must dry rapidly under ambient conditions.
(4) The coating must be resistant to severe handling operations.
(5) The coating should not evolve material which would be harmful to heat-treating furnaces, other equipment, or personnel.
(6) The coating should be continuous at relatively low temperatures and maintain this continuity through the temperature range to which the metal is exposed.
(7) The viscosity of the coating at the desired heat-treating temperatures should be such as to prevent the diffusion of gaseous materials.
(8) The coating should be free from ingredients which would cause metal contamination or deterioration.
(9) The coating must be readily removable after the metal's heat treatment, either by chemical or mechanical means, or by spontaneous thermal spalling.
(10) The coating must be compounded from materials such that its total cost would be commensurate with or less than the savings gained from its use, either from prevention of metal loss or retention of original surface condition.

The coatings described hereinafter are all characterized by a majority of the properties itemized above.

In general the temporary protective ceramic coatings field can be divided into three broad areas on the basis of temperature and, to some extent, on the reactions likely to be encountered in these temperature ranges. In most common steels and, more particularly, in some of the more recently developed tool steels, decarburization is likely to occur at relatively low temperatures of 1300° F. to 1850° F. Oxidation will also occur in this temperature range, although in developing the optimum metallurgical requirements in the substrate metal decarburization is often considered to be the more critical reaction. In general a vitreous-type coating is used to prevent such reactions. Owing to them ass of the metal often encountered and the low temperatures involved, the coatings used in this range are most readily removed by chemical treatment or by mechanical means.

An intermediate temperature range from 1800° to 2300° F. may be encountered with stainless steels and other high alloys where annealing or heat-treating operations are used in order to develop the desired metallurgical characteristics. Owing to the low carbon content of such metals and their inherently greater resistance to oxidation, coatings of considerably different compositions from those in the first temperature range are normally used, although they are still basically of a vitreous nature. They may, however, contain certain crystalline components in order to develop the appropriate thermal spalling characteristics.

The third temperature range encountered may be described as a hot-working range and may involve temperatures as high as 2400° F. Since size reduction and shape change may follow heat treatments of this nature, the characteristics of the coating may require considerable alteration. Where oxidation protection alone is desired for one reason or another, a vitreous-type coating may be satisfactory. On the other hand, where operations such as forging and hot rolling are to follow, the lubricity characteristics of the coating material are paramount and may require the utilization of a coating which is entirely crystalline in nature or one with only a minor amount of a vitreous component.

For all three temperature ranges, I have developed different coating compositions providing either adequate oxidation protection or decarburization resistance or both. See copending applications Ser. Nos.: 357,136, 357,255, and 357,135, all filed simultaneously with the instant application and assigned to the same assignee. In addition, the inorganic materials which have been utilized can be suspended or dispersed in an aqueous binder carrier or an organic vehicle, thereby incorporating one or another type of solidifiable resin or other binder imparting to the applied-and-dried coating sufficient strength to permit handling and some abuse. This insures that the coating will remain in place until the coated metal part has been transported to and inserted in the heat-treating or annealing furnace. The optimum organic components are such that they are readily eliminated within the furnace without destroying the continuity of the coating or leaving residual matter which may interfere with the efficacy of the inorganic components of the coating system. Such materials have a Conradson or equivalent residue (ash) of up to about 3.50% by weight. The Conradson procedure is described in ASTM Standards (1946) part III–A, page 120.

Thus, the coating systems which are hereinafter described deal not only with the design and development of new inorganic components but also with the development of the liquid aqueous binder carriers and the liquid organic resinous binder carriers.

The coating compositions here described for use in the intermediate temperature range are envisaged primarily for use with stainless steels and other complex alloys with low or nil carbon content. This need not necessarily preclude their use, however, on high carbon steels should the need arise.

In many heat-treating or annealing operations involving stainless steels, it is desirable that metal loss due to oxidation be prevented or that the original surface condition be maintained unchanged insofar as possible. This implies, therefore, particularly in regard to the latter requirement, that the coating be readily removable after the thermal processing operation. By proper design of the comminuted inorganic coating composition, it is possible to develop, through a severe mismatch of the thermal expansion coefficients of the coating and substrate materials, a sufficiently severe stress condition to cause spontaneous spalling from the metal surface. This stress may be either tensile or compressive in character. The latter is generally to be preferred since in some instances the materials required to develop a high coefficient of expansion are not sufficiently refractory to provide satisfactory resistance to oxidation in higher temperature ranges. However, the coating can also be removed in other ways; i.e. mechanically as by sandblasting, or chemically as by solubilizing the coating in hot aqueous caustic solution; see U.S. Patent No. 2,870,048.

Where removal by spalling is employed, it is important that the spalling does not occur too early in the cooling cycle. If it does, some oxidation of the substrate can occur after the protective coating has spalled. It has been found possible to adjust the coating composition using additions of oxides of the metals present in the metal substrate. Thus for a nickel-chromium stainless steel, oxides of iron, chromium, and nickel can be used. Nickel oxide has been shown to be the most effective retardant to spalling, causing to form apparently, a weak bond between the coating and basis metal which is ultimately overcome by the thermal stresses developed during cooling. By controlled additions of this material, spalling can be delayed to a temperature level below that at which oxidation will occur.

The furnace atmosphere can also have some effect on the behavior of the protective coatings and their ultimate spalling characteristics. A reducing atmosphere has been found to enhance the bonding effect of the nickel oxide and prevent spontaneous spalling. Additions of oxidizing agents such as arsenic trioxide have been found to alleviate this condition and are used in this capacity as needed. This apparently offsets the tendency for the added metal oxide (such as the nickel oxide mentioned above) to be partially reduced and thereby bond the coating more firmly to the metal substrate.

As mentioned previously, it is desirable that the thermal expansion coefficient of the coating be lower than that of the metal substrate. This is achieved in part by adjusting the composition of the vitreous portion of the coating. This may consist of one or more fused materials indicated by compositions to be presented subsequently. The vitreous materials are selected also to have adequate refractory and viscosity characteristics so that they will withstand the high temperatures involved and, at the same time, remain in position owing to their resistance to flow.

The vitreous compositions preferred for use in this invention are primarily comminuted alkaline earth aluminosilicates. They may contain other comminuted ingredients such as boric oxide in order to modify the physical properties of the resultant coating system. The basic composition utilized for many of the vitreous components is the eutectic for the ternary system enstatite ($MgO \cdot SiO_2$), silica ($SiO_2$), and cordierite ($2MgO \cdot 2Al_2O_3 \cdot 5SiO_2$) whose chemical composition is:

| | Percent |
|---|---|
| MgO | 20.3 |
| $Al_2O_3$ | 18.3 |
| $SiO_2$ | 61.4 |

Figure 2:
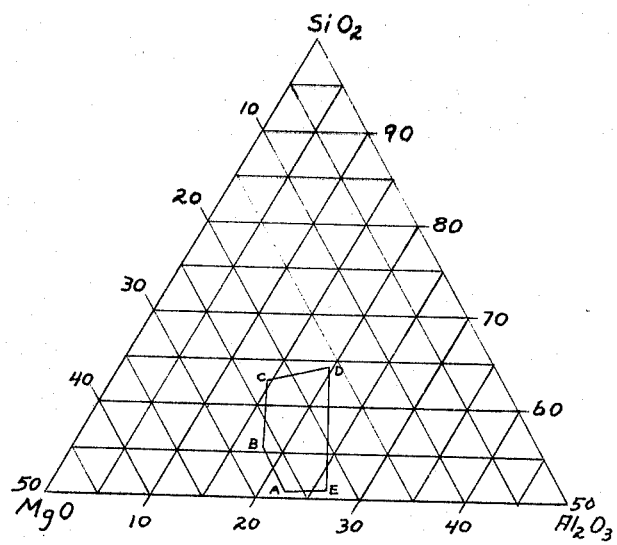

Substitutions of other alkaline earth oxides in amounts up to 6% by weight can be made for part of the MgO; additions of boric acid can also be made in amounts up to about 30% by weight while holding the aforementioned materials in essentially the same proportions as those presented above, or while holding proportions falling in the designated area of FIGURE 2, next described. Other additives are disclosed hereafter.

From practical limitations resulting from conventional smelting equipment, it is preferable that the basic vitreous system shown above be held within the boundaries of the 1400° C. isothermal line of the $MgO-Al_2O_3-SiO_2$ system (reported by G. A. Rankin and H. E. Merwin, American Journal of Science, 4th series, 45, 322, 1918) and shown on the diagram revised and redrawn by E. F. Osborne and Arnulf Muan (College of Mineral Industries, Pennsylvania State University, copyrighted 1960 by The American Ceramic Society). FIGURE 2 of the drawings identifies this area; namely, the pentagonal area ABCDEA. The parameters of the five corners of this area, in weight percent are:

| MgO | $SiO_2$ | $Al_2O_3$ |
|---|---|---|
| 16 | 64.3 | 19.7 |
| 22.2 | 63.2 | 14.6 |
| 26.6 | 55.4 | 18.0 |
| 26.6 | 50.6 | 22.8 |
| 23.0 | 51.0 | 26.0 |

It is also desirable in some instances that crystalline material be used in conjunction with the vitreous components as an additional means of controlling the ultimate properties of the coating systems. Among these materials are included clays and feldspars. Lithium feldspars, particularly petalite in either raw or calcined form, are preferred for control of expansion characteristics, while other alkali and/or alkaline earth forms are preferable for control of viscosity.

Accordingly, it is an object of this invention to provide coating compositions for metals composed mainly of alkaline earth alumino-silicates modified or not with (a) small amounts of boric acid, (2) nickel oxide, chromium oxide and/or arsenic trioxide, and/or (c) crystalline materials such as clay and/or feldspars of the alkaline and alkaline earth forms.

It is a further object to provide coating compositions of the kinds identified above dispersed in aqueous carriers or carriers consisting of solutions of organic solidifiable resin(s) in volatile organic solvent(s).

Another object is to provide metal articles coated with a dry protective film of the coating compositions of the preceding objects.

The foregoing objects will be understood from the description of the invention including the following examples, taken in conjunction with the attached drawings in which FIGURE 1 is a side view of a coated metal article of the invention, having a portion of the coating broken away to reveal the underlying metal, and in which FIGURE 2 identifies the 1400° isothermal line of the MgO-$Al_2O_3$-$SiO_2$ system cited above.

The following fritted compositions illustrate formulations which I have used successfully in the manners illustrated by the subsequent examples.

|  | Frit A | Frit B |
|---|---|---|
| CaO | 2.6% | 4.3% |
| MgO | 13.9% | 14.9% |
| $Al_2O_3$ | 13.1% | 20.3% |
| $SiO_2$ | 50.2% | 60.5% |
| $B_2O_3$ | 20.2% | |
|  | 100.0% | 100.0% |

It should be pointed out that in some instances it is possible to use various other materials instead of the pre-reacted (fritted) vitreous systems mentioned above. Thus, for example, materials such as silica, clay, boric acid, talc, and the like can be blended in a proportion such that they will yield the same ultimate chemical analysis as shown for the compositions indicated above.

In general, the following preferred compositional limits (in percent by weight) have been found to be effective for protection purposes for stainless steels and stainless steel-clad low-alloy steel in intermediate temperature ranges when comminuted so as to pass through a standard 200-mesh sieve:

|  | Percent |
|---|---|
| Frit A | 50–100 |
| All optional additives—one or more: | |
| Frit B | 0–100 |
| Petalite (raw or calcined) | 0–56 |
| Feldspars (other than Petalite) | 0–100 |
| Clay | 0–50 |
| Nickel oxide | 0–32 |
| Arsenic trioxide | 0–0.8 |
| Chromic oxide | 0–60 |

Frits A and/or B (or equivalent unfritted mixtures having comparable chemical composition) should total 100%. The remaining materials can be added then individually or in any desired combinations within the individual limits shown.

The following examples illustrate the principles of my invention and include the best modes presently known to me for practicing the invention in accordance with said principles. In all examples, the inorganic components are ground to pass through a standard 200-mesh sieve. The particle size distributions in such ground material have been found to be of negligible significance.

EXAMPLE I

The following ingredients were blended in a porcelain ball mill with an equal weight of water:

|  | Parts (wt.) |
|---|---|
| Silica | 4 |
| China clay | 27 |
| Boric acid | 27 |
| Talc | 30 |
| Nickel oxide | 12 |
| Arsenic trioxide [1] | 0.2 |

[1] Added where a reducing atmosphere is expected to be encountered during heat-treatment of coated metal.

The foregoing inorganic materials have the following ultimate chemical composition in percent by weight.

|  | Percent |
|---|---|
| $SiO_2$ | 42.9 |
| $Al_2O_3$ | 12.8 |
| MgO | 11.5 |
| $B_2O_3$ | 18.3 |
| NiO | 14.5 |
| $As_2O_3$ | 0.24 |
|  | 100.24 |

Recomputed so as to have $SiO_2$+$Al_2O_3$+MgO at 100%, the analysis is as follows:

(A)

|  | Percent |
|---|---|
| $SiO_2$ | 63.9 |
| $Al_2O_3$ | 19.1 |
| MgO | 17.0 |
| Total | 100 |

(Based on A)

|  |  |
|---|---|
| $B_2O_3$ | 27.2 |
| NiO | 21.6 |
| $As_2O_3$ | 0.36 |

The resulting aqueous suspension was applied by spraying onto stainless steel-clad low-carbon steel to a thickness of 6 mils. After being dried, the sample was heated for one-half hour in air at a temperature of about 1960° F. During subsequent cooling, the coating spalled spontaneously from the metal leaving a clean, bright surface, unchanged from its original condition.

EXAMPLE II

|  | Parts by weight |
|---|---|
| 40 percent: | |
| Frit A | 70.0 |
| Frit B | 20.0 |
| Petalite | 10.0 |
| 60 percent: [3] | |
| Rhoplex AC–33 [1] | 55.6 |
| Vinsol Emulsion [2] | 44.4 |

[1] Rhoplex AC–33 is a nonionic alkaline aqueous emulsion of an acrylic ester polymer; pH 9–9.5; 46–47% solids. The acrylic ester polymer has a $T_f$ of 28° C.; that is, it forms a continuous film at about room temperature.

[2] Vinsol Emulsion is an oil-in-water emulsion having a solids content of 50% (wt.); the internal (oil) phase is a hard pine resin which is insoluble in hydrocarbon solvents and has a methoxy content of 3–7% (wt.).

[3] This blend of emulsions leaves less than about 0.2% of residue (carbon and ash) when subjected to the Conradson or equivalent tests.

This organic vehicle composition is used with the inorganic powder so its percentage in the mixture is 60%. Enough water is added to adjust the viscosity to suit the method of application.

The most suitable proportions of carrier blends were found to fall in the range:

| | Percent |
|---|---|
| Rhoplex AC-33 | 65-40 |
| Vinsol Emulsion | 35-60 |

The resulting coating compositions can be applied to stainless steel, tool steels, iron base metals, etc. by spraying, brushing, or dipping and then dried in air or in a drying oven. The resulting coatings exhibit good resistance to breakage due to rough handling. When the coated metal articles are heated for up to several hours in a furnace having an oxidizing flame and a temperature of about 2300° F., and then are air-cooled, the coating spalls off leaving the metal surface in a bright, unscaled condition. For instance, the coating was applied by dipping to a centerless-ground 17-4 PH stainless steel rod to a coating thickness of 5 mils. The coated bar was dried and then was heated in a gas-fired furnace (using excess air to insure an oxidizing atmosphere) to a temperature of 1925° F. It was held at this temperature for one-half hour and was then removed and allowed to cool in still air. During cooling, the coating spalled spontaneously from the bar, leaving a clean, bright metal surface unchanged from its original condition.

EXAMPLE III

Fully comparable results were secured when the coating composition of Example II is replaced with the following composition:

| 50 percent: | Percent |
|---|---|
| Frit A | 50.0 |
| Feldspar | 50.0 |
| 50 percent: | |
| Acryloid F-10 [1] | 57.7 |
| Mineral spirits | 41.3 |
| Aluminum stearate | 1.0 |

[1] Acryloid F-10 is a solvent solution of poly(butyl methacrylate) resin; 40% solids; Gardner Holdt viscosity (at 40% solids) of G. The resin has a specific gravity of 0.91.

The same carrier system can be used in the ratio of one part by weight thereof to one part by weight of any other inorganic powder mixture of the invention.

The coating was applied by dipping to a 4" x 4" rough-ground billet section of 18-8 stainless steel to a coating thickness of 15 mils. After drying, the coated section was placed in a furnace at 1200° F. and therein was heated to a temperature of 2300° F. over a period of four hours. It was held at this temperature for four hours more, then was removed and air cooled. During cooling, the coating spalled from the surfaces of the billet section, revealing full retention of the original surface condition.

EXAMPLE IV

Results fully comparable with those of Example III are secured by coating stainless steel with the following composition, and then repeating Example III.

| 77 percent: | Percent by wt. |
|---|---|
| Frit A | 70 |
| Frit B | 20 |
| Petalite | 10 |
| 23 percent: | |
| Vinyl-toluenated-alkyd [1] resin | 28.2 |
| Xylene or naphtha (or mixtures) | 71.8 |

[1] This thermosetting resin leaves a residue (carbon plush ash) of about 3.5% by weight when subjected to a Conradson or equivalent test.

This example illustrates the usefulness of organic resinous binders which have relatively high Conradson residues and illustrates the fact that in the oxidizing furnace atmospheres wherein the coatings of this invention find special merit, the high Conradson residues can be handled satisfactory with no detrimental results to the underlying metal.

It will be understood that the liquid binder carriers of the examples can be replaced in toto with aqueous solutions or emulsions of a wide variety of solid or solidifiable resinous organic binding materials which have a total Conradson or equivalent residue (i.e. ash) less than about 3.5% by weight (ASTM Standards, 1946, part III-A, page 120) such as cellulose derivatives, glyceride drying oils, maleinized and amine-neutralized glyceride drying oils, rosin, maleinized and amine-neutralized rosin, nitrocellulose, carboxymethyl cellulose, cellulose acetate, cellulose butyrate, phenol/formaldehyde condensation products in various stages of resinification, amine/aldehyde and/or alkylated amine/aldehyde condensation products in various stages of resinification, thermoplastic copolymer resins, thermosetting copolymer resins or thermosetting reactive blends, etc. The water-insoluble materials can, if desired, also be used as binders by dissolving them in single or mixed volatile organic solvents. Since the ceramic, electric resistor, metal powder, and welding rod arts already abound with illustrations of the use of such and many other binding materials for binding comminuted solids into films, layers, putties, mastics, etc. applied to metallic substrates, no useful purpose is believed to be served by specific examples of these particular forms of embodiment of the invention.

As will be obvious, the present invention stems from my discoveries of the inorganic mixtures which at the subject temperatures exhibit unexpected protective effects, even in thin layers under 10 mils thickness, to the metallic substrates to which they are applied.

Having disclosed my invention, what I claim is:

1. An easily removable protective coating composition for metals to be heated to a temperature of between about 1850° F. and about 2300° F. which consists essentially of:
    (A) from about 40 to about 80 weight percent of:
        (1) comminuted inorganic material consisting essentially of MgO, $SiO_2$, $Al_2O_3$, whose total ultimate composition falls within the area ABCDEA of FIGURE 2 of the drawing, and
        (2) from about 10 to about 30 weight percent of said comminuted inorganic material of boric acid, and
    (B) from about 60 to about 20 weight percent of an innocuous liquid binder carrier in which said comminuted inorganic material is dispersed and suspended for application purposes.

2. An easily removable protective coating composition for metals to be heated to a temperature of between about 1850° F. and about 2300° F. which consists essentially of from about 40 to about 80 weight percent of:
    (A) comminuted inorganic material consisting essentially of:
        (1) MgO, $SiO_2$, $Al_2O_3$, whose total ultimate composition falls within the area ABCDEA of FIGURE 2 of the drawings, and
        (2) added metal oxides including:
            (a) from about 14 to about 32 weight percent of nickel oxide,
            (b) from about 0.2 to about 0.8 weight percent of arsenic trioxide, and
            (c) up to about 60 weight percent of chromic oxide and mixtures thereof, said percentages being by weight, based on the weight of said comminuted inorganic material, and
    (B) from about 60 to about 20 weight percent of an innocuous liquid binder carrier in which said inorganic material is dispersed and suspended for application purposes.

3. A coating composition as claimed in claim 2 which includes added comminuted crystalline material selected from the group consisting of:
(A) up to 50% of clay,
(B) up to 56% of lithium feldspar,
(C) up to 100% of other feldspars and mixtures of the foregoing, said percentages being by weight, based on the comminuted inorganic material falling within the area ABCDEA of FIGURE 2.

4. The coating composition of claim 3 wherein up to about 6% of other alkaline earth oxide is substituted for part of the MgO in said comminuted inorganic material falling within the area ABCDEA of FIGURE 2.

5. A coating composition as in claim 4 which includes up to about 30% of added boric acid based on the weight of comminuted inorganic material falling within said area ABCDEA of FIGURE 2.

6. A coating composition as in claim 5 wherein said comminuted inorganic material falling within the area ABCDEA of FIGURE 2 is composed ultimately of about 20.3% of MgO, 18.3% of $Al_2O_3$, and 61.4% of $SiO_2$.

7. The coating composition of claim 1 wherein the innocuous liquid binder carrier consists of a volatile organic solvent solution of solidifiable resinous binder.

8. The coating composition as claimed in claim 2 wherein said liquid binder carrier is a volatile organic solvent solution of solidifiable resinous binder.

9. A coating composition as claimed in claim 2 which includes added comminuted crystalline material selected from the group consisting of:
(A) up to 50% of clay,
(B) up to 56% of lithium feldspar,
(C) up to 100% of other feldspars, and
(D) mixtures of the foregoing, said percentages being by weight, based on the comminuted inorganic material falling within the area ABCDEA of FIGURE 2 and where said liquid binder carrier is a volatile organic solvent solution of solidifiable resinous binder.

10. A coating composition as claimed in claim 9 wherein up to about 6% of other alkaline earth oxide is substituted for part of the MgO in said comminuted inorganic material falling within the area ABCDEA of FIGURE 2.

11. A coating composition as claimed in claim 10 which includes up to about 30% of added boric acid, based on the weight of comminuted inorganic material falling within the area ABCDEA of FIGURE 2.

12. A coating composition as claimed in claim 11 wherein said comminuted inorganic material of claim 2 is composed ultimately of about 20.3% MgO, about 18.3% $Al_2O_3$, and about 61.4% $SiO_2$, said percentages being by weight and said comminuted inorganic material being in the form of comminuted frit.

13. A metal article having its surfaces coated with a dry film of the coating composition of claim 6.

14. A metal article having its surfaces coated with a dry film of the coating composition of claim 12.

References Cited

UNITED STATES PATENTS

| | | | |
|---|---|---|---|
| 3,202,554 | 8/1965 | Hornus | 148—22 |
| 2,612,457 | 9/1952 | Davis | 106—48 |
| 3,019,116 | 1/1962 | Doucette | 106—48 |
| 3,178,322 | 4/1965 | Schneider | 117—6 |
| 3,184,320 | 5/1965 | Michael | 106—48 |
| 3,222,219 | 12/1965 | Saunders et al. | 106—48 |
| 3,278,324 | 10/1966 | Nelson | 106—48 |

FOREIGN PATENTS

| | | |
|---|---|---|
| 549,118 | 11/1957 | Canada. |
| 1,171,565 | 10/1958 | France. |

OTHER REFERENCES

Fabian: Strippable Coatings, Materials in Design Engineering, May 1959, pp. 110–115.

HELEN M. McCARTHY, Primary Examiner

U.S. Cl. X.R.

106—48, 62; 117—6